United States Patent [19]

Prevorsek et al.

[11] 4,156,069
[45] May 22, 1979

[54] BISPHENOL-A/TEREPHTHALATE/CARBONATE MELT PROCESSABLE COPOLYMERS

[75] Inventors: Dusan C. Prevorsek, Morristown; Yali Kesten, Highland Park, both of N.J.

[73] Assignee: Allied Chemical Corporation, Morris Township, Morris County, N.J.

[21] Appl. No.: 764,623

[22] Filed: Feb. 1, 1977

Related U.S. Application Data

[63] Continuation-in-part of Ser. No. 672,945, Apr. 2, 1976, abandoned.

[51] Int. Cl.$^2$ ............................................. C08G 63/64
[52] U.S. Cl. ..................................... 528/182; 260/860; 526/60; 528/176; 528/193
[58] Field of Search .................... 260/47 XA, 860, 463

[56] References Cited

U.S. PATENT DOCUMENTS

| | | | |
|---|---|---|---|
| 3,028,365 | 4/1962 | Schnell | 260/47 |
| 3,030,331 | 4/1962 | Goldberg | 260/42 |
| 3,169,121 | 2/1965 | Goldberg | 260/47 |
| 3,409,704 | 11/1968 | Bailey | 260/860 |
| 3,729,447 | 4/1973 | Haberland et al. | 260/47 XA |

Primary Examiner—Theodore E. Pertilla
Attorney, Agent, or Firm—Robert A. Harman

[57] ABSTRACT

Copolymers consisting of bisphenol-A ("BPA"), terephthalate ("TP"), and carbonate moieties in mol ratio from 2:0.8:1.2 to 2:1.3:0.7, which are melt processable in the sense of (a) showing no more than 10% change in viscosity number upon compression molding for 10 minutes at 320° C. to form a plaque, (b) developing, in 2% (gm./ml.) DCM solution, a "yellowness index" of no more than 10 as observed by ASTM Test No. D-1925, using a 2 cm. path length; which copolymers approximate in properties the alternating copolymer consisting of the above moieties, as indicated by their having viscosity numbers ("I.V.") in the range between 0.6 and 1.5 dl./gm. and $T_G$ of 170° to 194° C., with $T_G$ vs. I.V. relationship conforming to the formula, $T_G = 192 - (11.5/I.V.) + 9$ and with difference of ($T_G$-HDT) of not over 15° C.; having Izod impact resistance (ft.-lb. per inch of notch) at 25° C. of at least 5; and being essentially free of pyridine and of anhydride linkages. The copolymers preferably have a mol ratio of BPA:TP:carbonate in the range from 2:0.9:1.1 to 2:1.2:0.8, viscosity number of 0.6-1 dl./gm., $T_G$ of at least 178° C. by differential scanning calorimetry, heat distortion (or deflection) temperature of at least 170° C., and Izod impact resistance at 25° C. of at least 6 ft.-lb. per inch of notch. Process is disclosed of making such copolymer involving adding, to a solution of bisphenol-A, a solution of terephthaloyl chloride; reacting at 2:1 molar proportions of BPA:TPC in dichloromethane/pyridine; then phosgenating. The product is especially useful in glazing and transparent sheet applications requiring high impact resistance, high abrasion resistance and/or high solvent resistance.

5 Claims, 5 Drawing Figures

A-[BTC]: EFFECT OF MOLECULAR WEIGHT ON $T_G$

POLY(ESTER-CARBONATE) PEC-37 (5-253)

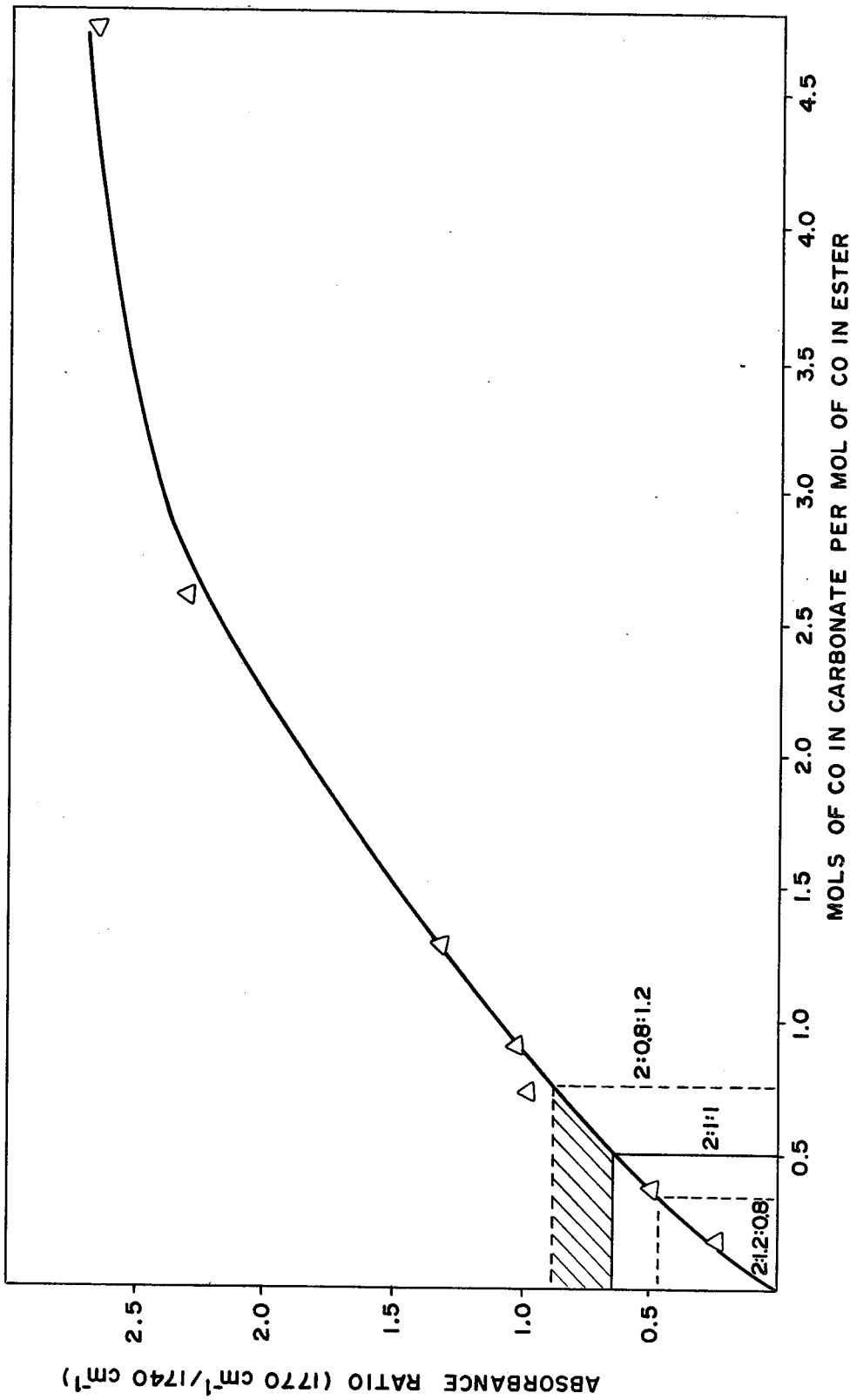

BISPHENOL-A/TEREPHTHALATE/CARBONATE MELT PROCESSABLE COPOLYMERS

CROSS REFERENCE TO RELATED APPLICATION

This application is a continuation-in-part of our copending application Ser. No. 672,945 filed Apr. 2, 1976, now abandoned.

BACKGROUND OF THE INVENTION

This invention relates to bisphenol-A/terephthalate/carbonate copolymers characterized by having a ratio from 2:0.8:1.2 to 2:1.3:0.7 of bisphenol-A ("BPA")-:terephthalic acid ("TPA"):carbonate moieties combined in the polymer product; by having short average lengths of the polyester and polycarbonate segments; by having a high degree of freedom from the nitrogen base and/or organic acid impurities inherent in prior bisphenol-A/terephthalate/carbonate copolymers, such that the polymers of the invention are melt processable; and having properties making our polymers uniquely useful.

Especially they are useful for glazing and transparent sheet applications demanding high impact resistance, high resistance to scratching and abrasion, and/or high solvent resistance. They exhibit melt processability, high tensile strength, high impact strength, and good clarity and freedom from color; approximating in these qualities the known commercial polycarbonates. They are unique in combining with the foregoing, as such and without being coated or modified, high resistance to abrasion and scratching; high resistance when under stress to the action of many common solvents including in particular hot water, carbon tetrachloride, toluene, gasoline, butyl acetate, and acetone; high dimensional stability at elevated temperatures as reflected in the high values for glass transition temperature ("$T_G$") and relatively small difference between $T_G$ and heat distortion temperature ("HDT"), and in low values for creep (i.e. extension under load over an extended time period) at elevated temperature; and high stability against heat as shown by retention of molecular weight upon heat treatments and low weight loss upon thermal gravimetric analysis ("TGA").

Polyester/carbonate copolymers have been the subject of prior investigations, including such copolymers from BPA reacted with carbonate precursors and with dibasic acids, especially adipic acid and isophthalic acid. A few tests using terephthalic acid have been reported (U.S. Pat. Nos. 3,030,311 of Apr. 17, 1962 and 3,169,121 of Feb. 9, 1965 to Eugene P. Goldberg; and a corresponding literature article in Polymer Preprints, vol. 5, No. 1 of 1964, pp. 233–238). The disclosure of U.S. Pat. No. 3,169,121 is closely similar to that of U.S. Pat. No. 3,030,331; the discussion below refers to U.S. Pat. No. 3,169,121 unless otherwise noted.

Two tests are reported using as reactants bisphenol-A (hereinafter "BPA"), terephthalic acid (hereinafter "TPA") and phosgene. One was at reactant mol ratio of 2:1 of BPA:TPA in a stirred pyridine medium, into which phosgene was bubbled until the reaction mixture became viscous (see col. 6, lines 47–54 and Ex. 5). The other (Ex. 12) was the same except using half as much TPA, i.e. 2:0.5 mol ratio of BPA:TPA.

The only properties given for the resulting polymers are Intrinsic Viscosity, Softening Temperature, and Tensiles (Strengths and Elongations). By contrast, there are three examples using isophthalic acid (Exs. 3, 10, 11) each of which reports the following additional properties: Transfer Molding Temperature, Heat Distortion, Impact Strength, Wt. Loss (percent at 24 hours, 230° C.), Flexural Strength, and Stiffness. It is explained in the literature article (page 238) that the tensile testing was on solution-cast film and that the impact and "$T_G$" tests were on transfer-molded bars. (The "$T_G$" figures in Table 1 of the literature article are the same figures as "Heat Distortion" in the patent examples and were determined by a penetration method also appropriate for heat distortion measurements; for methods of measurement, the literature article cites a Goldberg paper "J. Polymer Sci., in press" which article appeared in J. Polymer Sci., Part C, No. 4 of 1964, pages 707–730, see pages 715–717).

We have found that the BPA/TPA/carbonate copolymers prepared in pyridine reaction medium as prescribed by Goldberg:

(1) Do not correspond in composition to the ratios of the BPA:TPA reactants in the feed, but instead have markedly lower contents of TP moieties; and (2) Are thermally unstable under molding conditions, to the extent that moldings therefrom show bubbles and discolorations and show serious deterioration in viscosity number ("I.V.") of their solutions compared to that before molding. Correspondingly, these polymers prepared in pyridine reaction medium have Izod impact resistance of only about 1 to 2 ft.-lb. per inch of notch, measured by the usual method, compared to values of 12–16 ft.-lb. per inch for commercial polycarbonates. This deterioration under molding conditions is believed to explain why the Goldberg patents and literature article are silent as to properties such as molding temperature, impact resistance, heat distortion temperature and glass transition temperature ($T_G$) (as determined by penetration method) of his BPA/TPA/carbonate copolymers: those properties which require exposure to high temperatures in a molding operation, for purposes of measurement, are not reported by Goldberg for his BPA/TPA/carbonate copolymers.

The above phenomena of low TP moiety content in the polymer and deterioration of such polymer under molding conditions, we believe from our investigations to be due to some sort of interaction between terephthalic acid and pyridine, whereby the polymer, prepared in straight pyridine reaction medium, contains residues of pyridine in amounts on the order of 1%, strongly bound in the polymer. Also we find that TPA has to some extent modified the Goldberg polymer structure, in the form of terephthalic acid anhydride linkages incorporated in the chain.

When terephthaloyl chloride ("TPC") is used in pyridine reaction medium, instead of TPA, in accordance with one suggestion of the Goldberg patents, the resulting polymer still shows the above deficiencies.

Intensive purification procedures of such prior polymer lead to property improvement, e.g. impact resistance; but the polymer product following Goldberg still retains significant quantities of pyridine and acid impurities, still shows poor color after molding, still changes greatly in I.V. after heating and still falls well short of having as high a content of the TP moiety in the polymer as in the reactant mixture. In fact, we have found, the use of Goldberg's pyridine reaction medium precludes obtaining a ratio of BPA:TP moieties in the polymer product any higher than 2:0.8 even when the TPA or TPC ingredient is used in large excess over a 2:1 mol ratio.

SUMMARY OF THE INVENTION

The polymer of our invention is a melt processable bisphenol-A/terephthalate/carbonate copolymer having mol ratio, in the polymer product, of BPA:TP moieties in the range between 2:0.8 and 2:1.3; having essentially only short segments of polycarbonate, averaging not over 2.5 molecular units in length each; having viscosity number ("I.V.") in the range between 0.6 dl./gm. and 1.5 dl./gm., and having $T_G$ in the range between 170° C. and 194° C., and with $T_G$ vs. I.V. relationship approximately duplicating the convex upward curve of FIG. 1 of the drawings, and with difference between $T_G$ and heat distortion (or deflection) temperature ("HDT"), per ASTM D-648, of not over 15° C. An equation expressing the $T_G$/I.V. relationship for our polymers, as shown within the broken curves of FIG. 1, is: $T_G = 192 - (11.5/I.V.) \pm 9$.

By "melt processable" we mean that upon compression molding for 10 minutes at 320° C. to form a plaque, our polymer changes in viscosity number by no more than 10%; and when heated (in a sealed tube) under purified nitrogen for 30 min. at 350° C. and then dissolved to form a 2% (gm./ml.) solution in dichloromethane ("DCM"), the polymer develops a "yellowness index" of no more than 10 as observed according to ASTM Test D-1925, using a 2 cm. path length. ("Viscosity number" is given by specific viscosity divided by concentration, as measured in 40:60 weight ratio of ethylene tetrachloride:phenol at 25° C. and 0.5 gm./dl. concentration. "$T_G$" is the so-called glass transition temperature, which we measure by DSC (differential scanning calorimetry) at 20° C./min. in argon atmosphere by fusing the polymer powder, quenching in liquid nitrogen, and reheating the polymer sample. The yellowness index is measured in a Hunter D25 2P colorimeter).

Our polymers having Izod impact resistance (ft.-lb. per inch of notch) at 25° C. of at least 5.

Our polymers have pyridine content not over 200 parts per million; and are essentially free of anhydride linkages.

Goldberg had in mind and broadly discloses the possibility of (1) employing an acid chloride as reactant instead of an acid (U.S. Pat. No. 3,169,121 at Col. 11, lines 25-29); and (2) employing an inert solvent in addition to pyridine (U.S. Pat. No. 3,030,311 at col. 3, lines 9-20). He does not disclose that either such expedient, alone or in combination, would have any effect on the length of the ester and the carbonate segments of the polymer; or on the proportion of BPA:TP moieties in the polymer product; or on the thermal properties, such as the melt processability, the $T_G$ and the heat distortion temperature of the polymer product; nor does he suggest use of a molecular weight regulator, in particular the addition thereof prior to phosgenation.

Our product can be obtained by admixing terephthaloyl chloride ("TPC") with a pyridine/chlorinated organic solvent solution of BPA, at about 2:1 mol ratio of BPA:TPC in the reaction mixture; by carrying out the BPA/TPC reaction at temperature not above 35° C.; by using a reaction mixture containing at least a small excess of pyridine but not more than a 14-fold excess over the theoretical, and lower as the concentration of reactants is increased. The theoretical is the amount of pyridine required to combine with the theoretical amount of hydrogen chloride produced by the ester formation and by the carbonate formation involved in production of the polymer from the ingredients BPA, TPC, and phosgene, i.e. 2 mols per mol of BPA. Accordingly, at low concentrations of the reactants such as 10% by weight in the reaction medium, we use between 2 and 28 mols of pyridine per mol of BPA; together with between 1:3 volume ratio and 10:1 volume ratio, based on the pyridine, of a chlorinated organic solvent of the reactants, such as chlorobenzene or 1,2-dichloroethane or especially dichloromethane ("DCM") said medium being capable of dissolving low molecular weight BPA/terephthalate polyesters and capable of dissolving or colloidally dispersing the final polymer. More precisely, the relation of reactant concentration and DCM: pyridine proportions falls in the area beneath the boundary curve of FIG. 5 hereof. Thereafter we add a phenolic compound to serve as molecular weight regulator; then introduce the carbonate precursor, phosgene; then terminate the addition of phosgene, purging the system with air or inert gas to remove unreacted phosgene; and add a further quantity of phenolic compound to terminate polymer chains when the viscosity of the product has reached a predetermined value.

Specific molecular weight regulators which can be used include, but are not limited to, phenol, p-tert.butylphenol, and p-alpha-cumylphenol. Suitably, but not necessarily, the same compound is used as chain terminator after the purge removing phosgene.

Preferably, to reduce the quantity of pyridine which must be recovered, the chlorinated solvent will be in ratio of at least 2:1 by volume with the pyridine, and the weight of BPA plus TPC in the solution will be at least 10 gm./100 ml. of solvent. We consider DCM at present to be our preferred solvent, from the standpoint of polymer yield and ease of removal.

The combined weight of BPA and TPC supplied to the reaction can be at least as high as 35 grams per 100 ml. of solvent. At too high a monomer concentration, however, the maximum obtainable viscosity number is undesirably low (when chlorinated solvent predominates); and the TP combined in the polymer falls substantially below that in the feed (when pyridine predominates). Suitable upper concentration limits of monomer, for production of our polymers, are as indicated by the curve of FIG. 5 of the drawings, and suitable lower limits are indicated by the straight line at 10 gm./100 ml. concentration.

Preferably the temperature is maintained at not above 25° C. during the BPA/TPC reaction. Positive cooling means will ordinarily be employed for this purpose.

After the BPA and TPC have reacted, the phosgenation reaction can be allowed to proceed adiabatically, or with cooling only by heat loss to the surroundings; the temperature will normally not exceed 35° C.

One reaction involved in the ester formation is:

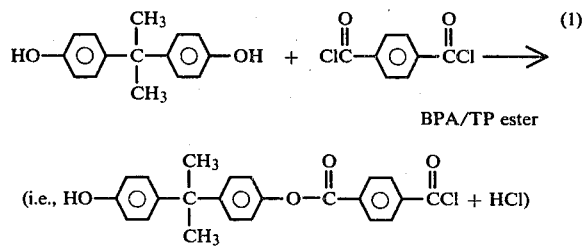

BPA/TP ester and one reaction involved in the carbonate formation is:

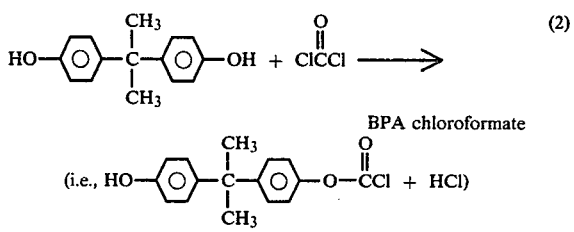

It will be appreciated that BPA/TP esters may interact together a number of times, thereby forming block polymers of ester segments

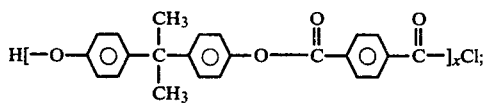

and BPA chloroformates may interact to form block carbonate segments

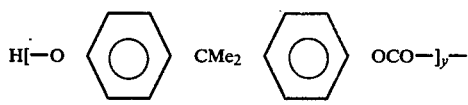

x and y each being often 3 or more-; or the reactions may alternate frequently to form short segments mostly having x and y each equal to 1 or 2.

If the TPC reactant enters the polymer at a lower ratio than the carbonate reactant (as always occurs in neat pyridine medium in accordance with our investigations) than necessarily the BPA/carbonate segments will have correspondingly greater average lengths than when TPC and carbonate each combines in equal ratio with BPA, i.e. at 2:1:1 mol ratio of BPA:TP:carbonate moieties in the polymer. Moreover, comparatively long segments of both types will be formed with the ingredients react in 2:1:1 ratio, if the conditions used favor producing either one of the polymer types at segment lengths averaging more than 3 units before the other type is produced. Accordingly, it will be appreciated that the formation of mostly short segments averaging not over 2.5 units of carbonate, as in our polymers, will only result under a favorable combination of reaction conditions including sequence of adding the ingredients and their relative proportions in the reaction mixture as the reaction proceeds. Moreover, to obtain desired value of viscosity number in the final polymer usually requires addition, at suitable stages, of a chain length regulator. The above noted combination of reactants, reaction medium, reactant proportions, and sequence of steps is suitable, in our particular case, for producing out melt processable polymers containing desirable ratios of BPA:TP:carbonate moieties, namely 2:1:1 and (upon adjustment of the reactant proportions) lower proportions down to 2:0.8:1.2, and higher proportions of the TP moiety, up to 2:1.3:0.7, at short segment lengths; and having viscosity number in the range 0.6 to 1.5 dl./gm., $T_G$ of at least 170° C., heat distortion temperature within 15° C. of the $T_G$, and Izod impact resistance (ft.-lb. per inch of notch) at 25° C. of at least 5 ft.-lb. per inch of notch.

By purification of the low molecular weight polyesters obtained upon reaction of 2:1 or higher mol ratio of BPA and TPC, it is possible to produce a 90+% pure di(bisphenol-A) terephthalate; and by then phosgenating this diester, to obtain a polyester/carbonate copolymer in which practically all of the ester segments and practically all of the carbonate segments are each only one unit long, i.e. an "alternating" polyester/carbonate copolymer. We have produced such copolymer and determined its properties; they prove to be very closely approximated by our 2:1:1 short segment polyester/carbonate copolymer of this invention.

A particular combination of properties, significant as indicating characteristics close to those of the true alternating copolymer, is (1) a glass transition temperature, $T_G$, of at least 178° C. combined with (2) heat distortion temperature, HDT (measured by deflection per ASTM D-648) of at least 170° C.; and (3) Izod impact resistance (ft.-lb. per inch of notch) of 6 or higher.

BRIEF DESCRIPTION OF THE DRAWINGS

In the accompanying drawings.

Such points (corresponding to experiments using neat pyridine as reaction medium) all lie well below the curve for our polymers, i.e. toward the value of about 147°–150° C. for $T_G$ of pure BPA polycarbonate, indicating relatively longer polycarbonate segments in these polymer products, viz. averaging longer than 2.5 units in length. These points are at $T_G$ values such as found experimentally for BPA/TP/carbonate copolymers analyzed to have lower contents of the TP moiety than in the 2:0.8:1.2 ratio polymers of our invention. Consistently therewith, the polymers giving rise to these points, obtained in neat pyridine reaction medium, analyzed as having BPA/TP/carbonate mol ratios of (a) 2:0.67:1.33; (b) 2:0.77:1.23; (c) 2:0.55:1.45; (d) 2:0.54:1.46; (e) 2:0.29:1.71. These copolymers had viscosity numbers (measured on one or two samples) of (a) 0.82, 0.85; (b) 1.37, 1.38; (c) 1.48; (d) 1.55; (e) 2.76, 2.72 dl./gm.

FIG. 2 shows a calibration curve obtained by plotting infrared absorption ratios for wave numbers 1770 cm.$^{-1}$:1740 cm.$^{-1}$ (i.e. for carbonate CO groups and carboxylate CO groups) vs. composition, expressed as mol ratios of carbonate CO:ester CO. The experimental points for the curve were determined by infrared measurements using KBr crystals as support for dried films from solutions or dispersions, in tetrachloroethylene, containing known quantities of commercial bisphenol-A polycarbonate and known quantities of BPA/TP polyester (prepared interfacially as is known—W. M. Eareckson, III; J. Pol. Sci. vol. 40, pp. 399–406 (1959)—from bisphenol-A and terephthaloyl chloride). Note that in the terephthalate moiety there are two carbonyl groups, versus one carbonyl per carbonate moiety; so that the values for the abscissae in FIG. 2 (i.e. the "X" coordinates in the plot) must be multiplied by two, to obtain the corresponding mols of carbonate linkages per mol of terephthalate linkages in a BPA/TP/carbonate copolymer. Accordingly, in FIG. 2 the point (0.5) on the X-axis represents a composition having equimolar proportions of ester and carbonate moieties, i.e. the copolymer having 2:1:1 molar composition in BPA:TP:carbonate moieties.

The calibration curve of FIG. 2 differs markedly from a straight line; hence a determination of this actual calibration curve must be made, to obtain reliable results for carbonate:carboxylate mol ratios in BPA/TP/carbonate copolymers by the infrared absorption method.

Figure 3:
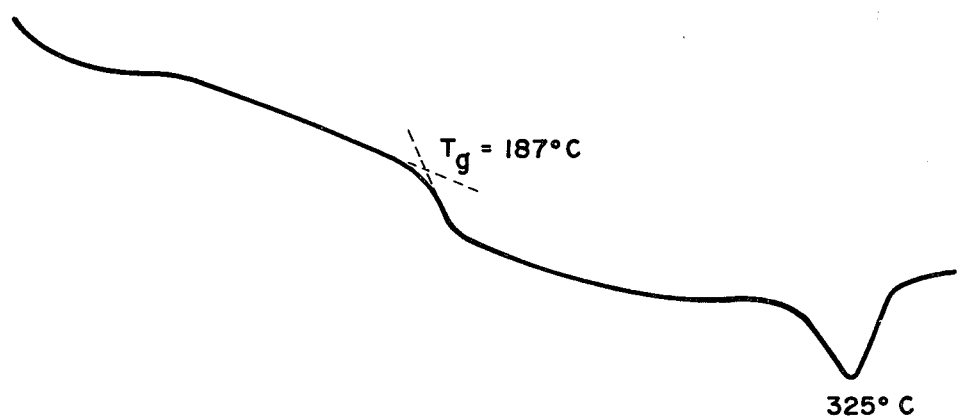

FIG. 3 shows a typical differential scanning calorimeter ("DSC") curve revealing $T_G$ at 187° C. In this curve a melting point at 325° C. is also revealed; some of our polymers do and others do not show a melting point by DSC analysis. The viscosity number for this particular polymer was 1.42 dl./gm.

Figure 4:
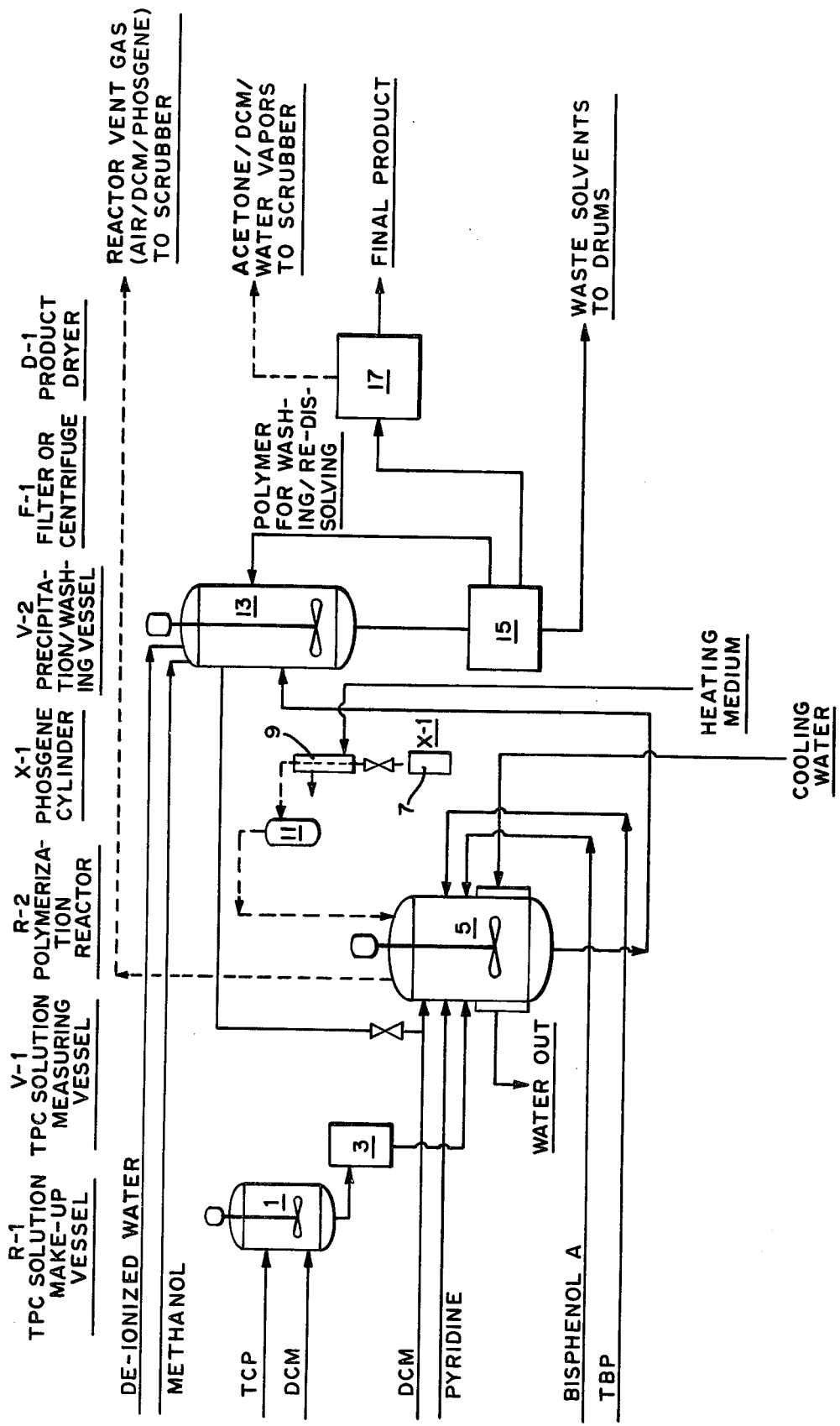

FIG. 4 is a block flow diagram illustrating a process suitable for production of our polymer.

Figure 5:
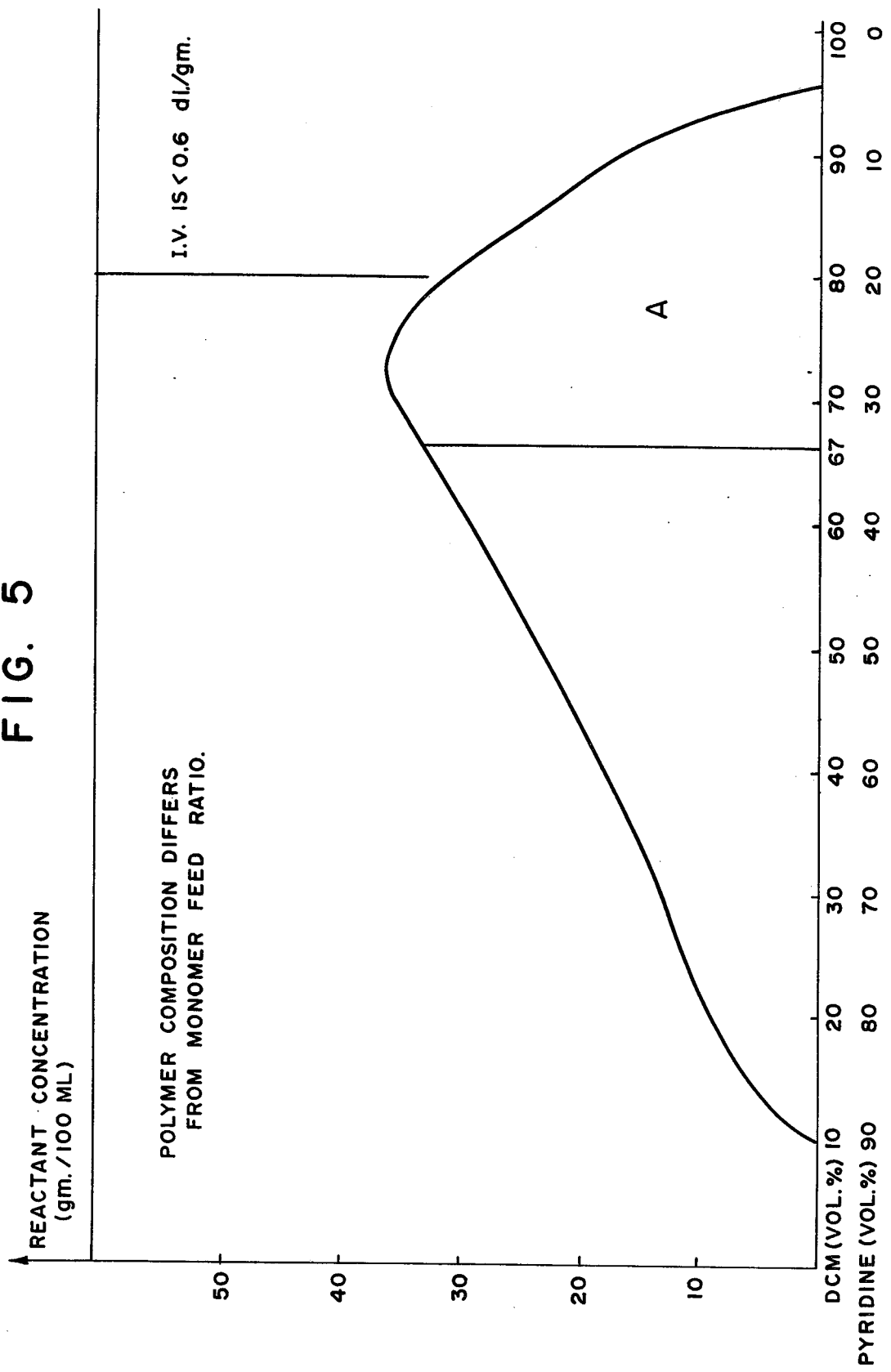

FIG. 5 is a plot of an upper boundary curve of monomer (BPA plus TPC) concentrations (in grams per 100 ml. of solvent) vs. volume percent of pyridine and DCM in the solvent mixture, defining preferred relationships for production of our polyester/carbonate copolymers. (In this figure the conditions exemplified by Goldberg lie entirely on the vertical axis of coordinates, i.e. DCM=0). Use of conditions above the curve and toward the left results in products having lower TP ratio than in the feed; and conditions above the curve and to the right result in undesirably low intrinsic viscosities.

DESCRIPTION OF THE PREFERRED EMBODIMENTS

Preferred polymers in accordance with our invention consist essentially of BPA, TP and carbonate moieties in the mol ratio range from 2:0.9:1.1 to 2:1.2:0.8 and have viscosity number in the range 0.6 to 1 dl./gm. and $T_G$ of at least 178° C.; and Izod impact resistance (ft.-lb. per inch of notch) of at least 6. These polymers preeminently combine melt processability with excellent levels of the properties cited above.

Preferred process conditions of monomer concentration and DCM:pyridine proportions are within the curve shown in FIG. 5. The most favorable conditions are within the area "A" of FIG. 5, bounded by the 10 gm./100 ml. line, the curve, and the 67% DCM/33% pyridine line (i.e. DCM:pyridine volume ratio is at least 2:1).

EXAMPLES

There follows a complete description of specific embodiments of our invention and of the best mode contemplated by us for carrying out our invention; this description is to be interpreted as illustrative rather than limiting. In this description "parts" is by weight unless otherwise stated.

Example 1—2:1:1 mol ratio polymers

In accordance with the flow diagram of FIG. 4, a filtered solution of 27.4 parts of essentially pure terephthaloyl chloride ("TPC") in vessel (1) is pumped to weighing vessel (3). This solution, in a chlorinated hydrocarbon solvent such as dichloromethane ("DCM") or chlorobenzene, can be made up at ambient temperature by stirring solid TPC into the solvent (purified by distillation). A suitable weight proportion of TPC:DCM is 27.4 parts:224 parts.

Since TPC reacts with moisture to form TPA, and pure TPC is desired for our process, all vessels and piping throughout the operations must be clean and dry, and flushed with dry air or nitrogen before use. Throughout the operations, glass or glass-lined or PTFE-lined vessels and piping; and stainless steel agitators, centrifuge, and drying over are used. An atmosphere of dry nitrogen is employed. All solvents are purified by distillation and all solutions are filtered until clear, suitably through sintered glass filters for the final filtration.

Similarly a solution of 65.9 parts of reagent grade bisphenol-A ("BPA") is made up in 69 parts of pyridine. This BPA solution is supplied to a jacketed reactor (5); it is washed from the make-up vessel and piping into reactor (5) with a measured amount of DCM solvent. Additional DCM is added to reactor (5), bringing the weight proportions of BPA:pyridine:DCM to 65.9:69.0:562 parts.

The TPC solution is sprayed by siphoning over a cone splitter - to avoid local high concentrations in the reaction mixture - into reactor (5) just above the liquid level of the vigorously stirred BPA solution, at a steady rate of about 125 pounds per hour, at which the temperature of the reaction mixture, being cooled by circulating water in the jacket of reactor (5), remains below 25° C. as a maximum.

Then a solution of 1.34 parts by weight of p-tert.butylphenol in DCM is added to the BPA/TPC reaction mixture to serve as a molecular weight regulator.

Finally, phosgene from weighed storage vessel (7) is vaporized in heating vessel (9) and passes, at a rate of about 9 pounds per hour, through filter (11) for removal of any particles and through a dip tube, into the well stirred reaction mixture in reactor (5), which is initially under partial vacuum. The pressure approaches atmospheric as phosgene is added. The temperature during this phosgenation can be about ambient; cooling is not necessary.

The mixture becomes viscous; its viscosity number can be estimated from the viscosity of the reaction mixture as measured in a Brookfield viscometer, which can be taken periodically on samples to serve as a control on phosgene addition. Thorough agitation is maintained by increasing the rate of stirring to counter the effect of viscosity.

The amount of phosgene added is in excess over the theoretically required amount. Vapors vented from reactor (5) are passed through an alkali scrubber (not shown) to remove phosgene.

When the viscosity of the reaction mixture has reached a predetermined level, phosgene addition is stopped and the vapor space in reactor (5) is purged with air or inert gas, passing out through the scrubber, to remove phosgene therefrom. A solution of 2 parts of p-tert.butylphenol dissolved in DCM is added, to react with carboxychloride end groups and with any excess phosgene dissolved in the reaction mixture. The reaction mixture is stirred for 1 hour; then methanol (about 6.5 weight parts) is added to assure inactivation of any remaining carboxychloride groups and any traces of phosgene in solution.

Promptly after the addition of methanol, the polymer is precipitated in stirred vessel (13), by adding the polymerization reaction mixture, very slowly at first (about 5 gal. in 5 to 10 minutes) with very good stirring, to 1800 parts of acetone in vessel (13), equal to three times the volume of the polymerization reaction mixture. Continue stirring after this first addition to break up any agglomerates into small particles; then add the rest of the reaction mixture in increments small enough to maintain small particle size of the precipitated polymer.

The precipitated polymer is separated from the precipitation medium in centrifuge (15) and is returned to vessel (13), or passed to a separate vessel, for the first of six acetone washings. The acetone wash is for 10 minutes with about 460 parts of acetone (one-fourth the quantity used for precipitation). The washed polymer is again recovered by centrifuging and then is given a first wash with 70°-100° C. distilled water, about 580 parts. The centrifuged polymer is again washed with acetone, as before, and centrifuged.

The polymer is then redissolved in 928 parts of DCM at about 30° C. and is filtered, through a 50 micron filter of 316 stainless steel screens, into the precipitation vessel (13) containing again 1800 parts of acetone.

The second precipitation of polymer is carried out by the same procedure as the first; it is followed by the third acetone wash, second hot water wash and fourth acetone wash.

A second redissolution in DCM as before, and the third precipitation of polymer in acetone, each followed by centrifuging, initiate the last cycle of the purification. This is followed by a final sequence of fifth acetone wash, centrifuging, third hot water wash, centrifuging, last acetone wash and centrifuging.

We have noted in tests of color of compression molded polymer that a single precipitation-wash cycle suffices to give our polymer good melt processing properties.

The effluent solvents from centrifuge (15) are collected in drums; and the polymer goes forward to vacuum drying oven (17) where it is dried for 16 hours at 100°-130° C. and 10-20 mm. Hg absolute pressure. The vapors from oven (17) are vented through the scrubber.

Typical polymers produced by the foregoing procedure were compression molded for 10 minutes at 320° C. into plaques of about 1/16-1/8 inch thickness. Polymers "A" and "C" were also successfully injection molded and extruded into strands. Typical injection molding conditions were: rear temp.=300° C.; front temp.=310° C.; nozzle temp.=280° C.; injection pressure=1600 psi; mold temp.=135° C.; cycle time=37 sec. Typical extrusion conditions for ⅛" diameter strands using a 1.5 inch, 3 H.P. extruder were: rear temp.=270° C.; barrel temp.=290° C.; die temp.=300° C.; die pressure=3000 psi; extrusion rate=16 lbs./hr.

Characteristic properties of such polymers are as follows:

Table 1

| Polymer | A | B | C |
|---|---|---|---|
| Viscosity No. (dl./gm.) | | | |

Table 1-continued

| Polymer | A | B | C |
|---|---|---|---|
| initial | 0.70 | 0.85 | 0.76 |
| after molding | 0.67 | 0.85 | 0.76 |
| $T_G$ (by DSC, °C.) | 178° | 180° | 176° |
| BPA:TP:Carbonate ratio (by IR) | 2:1:1 | 2:0.8:1.2 | 2:0.9:1.1 |
| Pyridine Content | <20 ppm | <20 ppm | — |
| Anhydride linkages - essentially absent | | | |

Pyridine content is determined by dissolving the polymer powder in 2 ml. of warm DCM and adding 0.4 ml. of water and 1 drop of conc. HCl; shaking well; separating the upper, aqueous layer; and adding granular sodium carbonate in small increments to this aqueous solution until no further evolution of $CO_2$ is observed. The resulting aqueous solution is analyzed for pyridine by gas chromatography.

Anhydride linkages, if present in substantial proportion in these polymers, are observable by comparison of the IR spectrum of such polymer vs. the spectra of terephthalic acid anhydride and of our 2:1:1 ratio BPA:TP:carbonate copolymer.

Such polymers (1 gm.) were placed in a tube, which was evacuated, flushed with high purity nitrogen, and sealed; then heated 30 min. in an aluminum block held at 350° C. The resulting samples were dissolved in dichloromethane. Table 2 below shows results of tests of yellowness and solution viscosity.

Table 2

| | Yellowness Index (2 gm./100 ml. in DCM) | | Viscosity Number (25° C., 0.5 gm./dl. in 40:60 w/w tetrachloroethane:phenol) | | |
|---|---|---|---|---|---|
| Polymer | Initial | After Heating | Initial | After Heating | % Change |
| Polymer of the invention | 1.1 | 5.5 | 0.85 | 1.02 | +17 |
| Comparison "A" (TPA) | Hazy | 12.1 | 1.38 | 0.57 | −59 |
| Comparison "A" (Pfd) | " | 11.6 | 1.52 | 0.88 | −42 |
| Comparison "B" (TPC) | " | 14.2 | 2.72 | 0.77 | −72 |
| Comparison "B" (Pfd) | " | 20.0 | 2.55 | 0.85 | −67 |

Comparison "A" is a copolymer prepared in accordance with Example 5 of U.S. Pat. No. 3,169,121 (above cited) except on a larger scale, to provide more product (i.e. using 450 gm. of BPA, 163.6 gm. of TPA and 4.7 liters of pyridine).

Comparison "B" is like Example 1 of U.S. Pat. No. 3,169,121 but modified by adding TPC to the BPA/pyridine solution instead of adipyl chloride, and using a scale of 400 gm. of BPA, 161.7 gm. of TPC, and 5 liters of pyridine.

Comparisons "A" (Pfd) and "B" (Pfd) are the products of Comparisons "A" and "B" respectively, further purified by the method of Example 3 below (grinding and dissolving in DCM, precipitating with methanol, again grinding and dissolving in DCM and precipitating with methanol, washing with methanol, filtering and drying).

The comparison products, and copolymer of the invention, were examined for the properties shown in Table 1 above, with the following results:

TABLE 3

| Polymers | Comparisons | | | | Invention |
|---|---|---|---|---|---|
| | "A" (TPA) | "A" (Pfd) | "B" (TPC) | "B" (Pfd) | |
| Viscosity No.(dl./gm.) | | | | | |
| Initial | 1.37,1.38 | 1.52 | 2.76,2.72 | 2.55 | 0.96 |
| After molding | 0.68,0.62 | 0.95,0.84 | 0.76,0.64 | 1.42 | 0.98 |
| $T_G$ (°C.) | 175 | 188 | 170 | 175 | 185 |
| HDT (° C.) | 153 | 165 | 141 | 153 | 173 |
| BPA:TP: Carbonate (by IR) | 2:0.77:1.23 | | 2:0.29:1.71 | | 2:0.93:1.07 |
| Pyridine content (ppm) | 3,500 | 20 | 2,900 | <20 | <20 |

Anhydride linkages were observed, by the method above noted in connection with Table 1, in the above Comparison Polymer "A" (TPA).

Additional experiments were made in an effort to obtain higher BPA:TP ratios in polymers prepared as in Comparison "B" (TPC) above, but adding higher proportions of TPC to the BPA solution in neat pyridine. The BPA solution in these experiments contained 41.2 gm. of BPA. The resulting ratios, determined by IR analysis, are shown in Table 4 below.

Table 4

| BPA/TPC mol ratio in feed | BPA/TP mol ratio in polymer | Polymer I.V. (dl./gm.) |
|---|---|---|
| 2:1.2 | 2:0.7 | 1.38 |
| 2:1.3 | 2:0.8 | 1.58 |
| 2:1.4 | 2:0.8 | 2.09 |

When the mol ratio of BPA/TPC in feed was increased to 2:2, the resulting product had I.V. of only 0.07 dl./gm. Since products of this low molecular weight do not exhibit useful properties, the product was not analyzed.

The following are further specific examples showing preparation and certain properties of our polymers. In each example, unless otherwise noted, the procedure was essentially as in Example 1.

Example 2 A—alternating copolymer

Starting Materials:
4.08 mols (931.2 gm.) BPA/1200 ml. pyridine/6000 ml. DCM; filter 1.92 mols (390.0 gm.) TPC/2500 ml. DCM; filter Addition:
16 hr. at room temperature.

Work-up of low molecular weight polyester (BPA terephthalate)
1. Wash with 4% HCl (ag)=480 gm. and with water (4 times) to pH 4.5 and faint chloride ppt. with AgNo3 in the wash water. Wash removes pyridine as its hydrochloride salt.
2. Evaporate organic phase to dryness.
3. Disperse solid residue in 10 parts of methanol and filter. Polymer residue is separated (mostly higher polymers than diester).
4. To filtrate, add water until cloudy, then 10% more water. Filter. Filtrate is mostly BPA.

Phosgenation
1. Solid residue from work-up step (4) is dissolved in DCM and phosgenated using excess phosgene.
2. When solution becomes viscous, the phosgenation is terminated and 50 ml. of methanol is added.

Recovery

The polyester/carbonate phosgenation product is recovered and purified as in Example 3 below.

Identification of solid residue from work-up step (4)
1. Analysis of product (by liquid chromatographic peak heights for —OH per gram)=94.2% by weight is the diester, di(BPA)-terephthalate; 3.3% is BPA; 2.5% is polymer higher than di(BPA)ester.

Properties of polyester/carbonate from above-identified diester

| Viscosity No. | 1.47 dl./gm. |
|---|---|
| $T_G$ | 192° C. |
| BPA:TPA:carbonate moieties (by IR) | 2:1:1 |

Example 2B—Investigation of polyester prepolymer

The polyester prepolymer was formed as in Example 2A above, except that (as in Example 3 below) the temperature used was about 0° C. The total product, after separation from pyridine hydrochloride, was analyzed by high pressure liquid phase adsorption chromatography using a cyano-type moiety chemically bonded through a Si—O—Si bond onto an irregularly shaped silica gel substrate. For the purpose, the product was dissolved as a 0.1% solution in reagent grade chloroform (containing 1% ethanol as stabilizer). The separation into BPA and polyester components was based on the differing ratio of hydroxyl groups in the successively higher polyesters of formula $(AB)_nA$, where "A" represents bisphenol-A, "B" represents terephthalate moiety, and "n" is an integer from 0 upwards. The smaller the ratio of hydroxyl groups, the longer the polyester is retained in the column.

The results are shown in Table 5 below.

Table 5

| Product Components | Mol % Components | | | Mol % Polyester (N=1) Components | |
|---|---|---|---|---|---|
| | Found | Theory (a) | | Found | Theory (b) |
| n=0 free BPA | 44.74 | 45.85 | | | |
| =1 ABA | 27.08 | 26.70 | n=1 | 49.00 | 50.00 |
| =2 (AB)$_2$A | 15.36 | 13.79 | =2 | 27.80 | 25.00 |
| =3 (AB)$_3$A | 7.10 | 7.01 | =3 | 12.85 | 12.50 |
| =4 (AB)$_4$A | 2.94 | 3.53 | =4 | 5.33 | 6.20 |
| =5 (AB)$_5$A | 1.19 | 1.78 | =5 | 2.16 | 3.10 |
| =6 (AB)$_6$A | 0.97 | 0.89 | =6 | 1.75 | 1.55 |
| =7 (AB)$_7$A | 0.61 | 0.45 | =7 | 1.11 | 0.77 |

(a) "Theory" is for the components in the reaction product of bifunctional monomers, A and B, reacting at initial mol ratio of 2:1 to form products $(AB)_nA$, where "n" is 0, 1, 2, etc., assuming complete reaction and most probable distribution. (See P. J. Flory "Principles of Polymer Chemistry" Cornell University Press, New York, 1953 p. 319).

(b) "Theory" for polyester components is for the polyester sequence lengths in a random copolymer in which equimolar acid dichloride and carbonate moieties are linked in the copolymer by bisphenol-A moieties. It is seen that the distribution of lengths found in our polyester prepolymer corresponds closely to the theoretical polyester sequence lengths in such random (and neither alternating nor block) BPA/TP/carbonate copolymer. The theory of such non-equilibrium copolycondensation reactions is discussed by V. V. Korshak et al. in J. Macromol. Sci.-Rev. Macromol. Chem. C14(1), 27-63 (1976).

Example 3—2:1:1 mol ratio polymer by low temperature preparation 931.2 gm. bisphenol-A (4.08 mols) in 1.2 liters of pyridine+6.0 liters of $CH_2Cl_2$, was filtered and cooled to 0° C.

390.0 gm. terephthaloyl chloride (1.92 mols) in 2.4 liters of $CH_2Cl_2$ was filtered and added dropwise over a period of 16 hours with agitation.

14 gm. of p-t-butylphenol (0.09 mol) in 50 ml $CH_2Cl_2$ was added to the solution to serve as molecular weight regulator.

Phosgene was then introduced by condensing the gas into the top of the reaction flask at a rate of 1.5 g/min. After some 4 hrs. at 20°-30° C. under vigorous agitation, when the solution had become extremely viscous, 25 gm. phenol in 100 ml. $CH_2Cl_2$ was added to the reaction mixture to react with the chloroformate chain ends.

The mixture was stirred for about 1 hour; then 200 ml. of methanol was added to terminate any remaining active chain ends. The reaction mixture was poured into 15 liters of methanol with stirring, precipitating the solid polymer which was washed with methanol in the blender and filtered on a fritted glass filter. The polymer was ground and redissolved in $CH_2Cl_2$ (10 liters), the solution was stirred 15 hours, and the solution was filtered and again the polymer was precipitated in methanol. After again grinding and redissolving in $CH_2Cl_2$, precipitating a third time, and washing 4 times in the blender the polymer was filtered, vacuum dried (18 hours at 110° C., 2 hours at 170° C.) and sealed off in its container.

By infrared analysis, the copolymer product showed ratio of the moieties BPA:TP of 2:0.93, vs. 2:0.94 in the feed.

Various properties of the product were determined by standard tests, with the following results, upon the above and like products:

| | |
|---|---|
| Viscosity number (dl./gm.) | = 0.89 |
| $T_G$ (°C.) (DSC method) | = 183° |
| Heat distortion (deflection) temp. | |
| (2.64 psi) °C. | = 175° |
| Density (gm./ml.) | 1.206 |
| Tensile properties: | |
| Yield strength (psi) | 9,300 |
| Modulus (psi) | 350,000 |
| Elongation at break (%) | 25-40 |
| Flexural properties: | |
| Strength (psi) | 12,000 |
| Modulus (psi) | 300,000 |
| Izod impact resistance at 25° C. | |
| (ft-lb/inch notch) | = 8.3 |
| Izod impact resistance at −40° C. | = 3.7 |
| Taber abrasion (weight loss) | |

| Cycles | mg. loss |
|---|---|
| 250 | 1.9 |
| 500 | 4.4 |
| 1000 | 9.4 |

Scratch hardness by ABRASER grooving tool with 1000 gm. load on the beam (gm. load×100/width in mils of groove produced)

| | |
|---|---|
| Rockwell hardness | = M73, R124 |
| Water absorption (wgt % uptake in 24 hours) | = 0.2% |
| Coefficient of linear thermal expansion | = 6.6 × $10^{-5}$ |

Tensile creep (elongation), at 3000 psi and 100° C., reaches 2.5% in 500 hours.

A test for tensile heat distortion temperature (ASTM-1637) using an air oven, for a 1/16" thick type "C" specimen at 50 psi and 2° C./min. temperature rise, showed no elongation at 200° C., started to elongate at 210° C., and reached 50% elongation at 215° C. A commercial polycarbonate, tested likewise, reached 50% elongation at 165° C.

| Dielectric strength (v./mil) = 345-427 | | |
|---|---|---|
| Temperature (°C.) | Dielectric Constant | Dissipation Factor (at 100 Hz) |
| 24 | 3.01 | .00103 |
| 40 | 3.05 | .00084 |
| 86 | 3.13 | .00094 |
| 140 | 3.25 | .00143 |

Example A—Comparison—Lower limit of TPA moiety

Procedure was essentially the same as in Example 1, except the mol ratio of BPA in the charge:TPC was 2.0:0.8; and as an alternative to p-tert.butylphenol, the chain terminator used was p-alpha-cumylphenol (0.1 mol each time).

Figure 1:
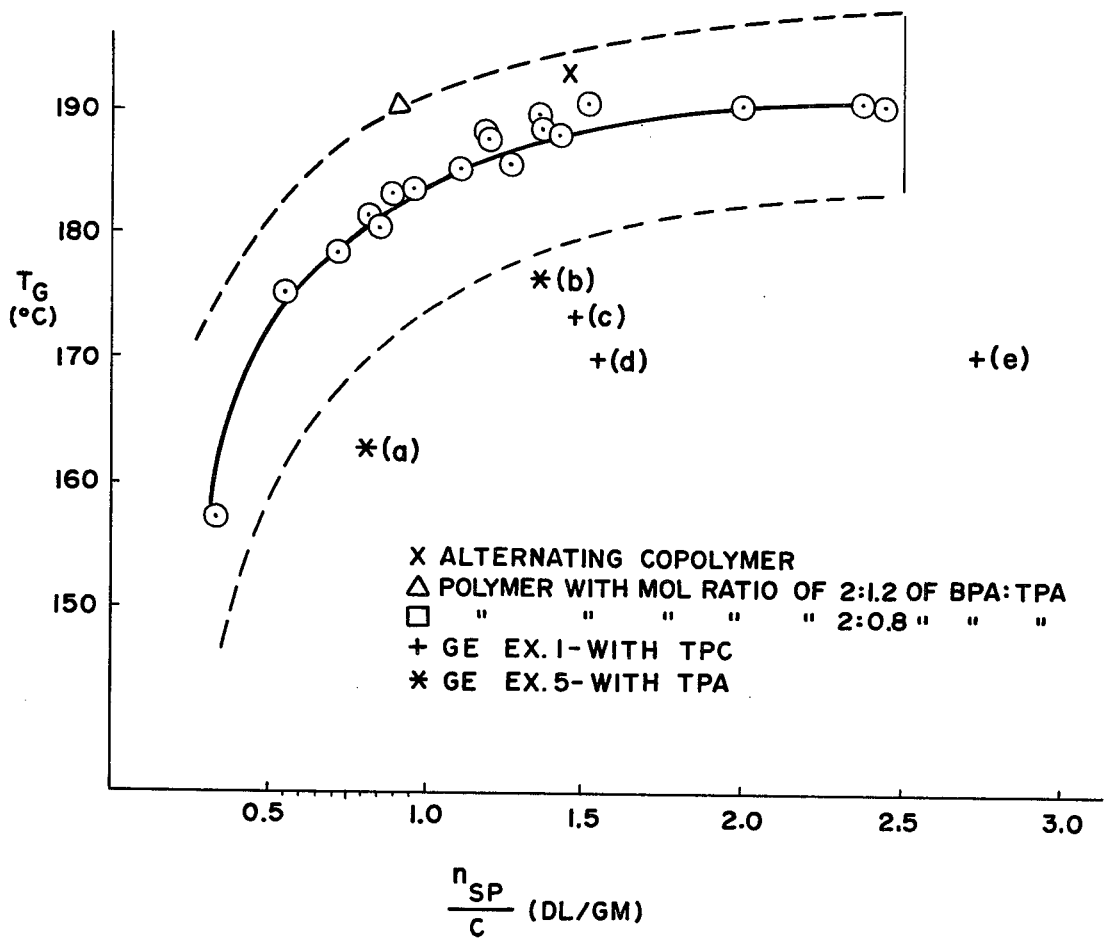
FIG. 1 shows a solid curve representing the relationship between $T_G$ and I.V. for our copolymers having essentially a composition of 2:1:1 mol ratio of the moieties BPA, TP and carbonate, and shows dashed curves representing such relationship for our copolymers of ratio 2:1.3:0.7 (upper) and 2:0.8:1.2 (lower). The experimental points are circled for the solid curve and marked with a triangle and a square for the compositions 2:1.2:0.8 and 2:0.8:1.2 respectively. The point marked "X" is for the copolymer of Example 2 below, about 94% pure in true alternating copolymer, and having viscosity number of 1.47 dl./gm. The figure found for a copolymer 92% pure in alternating copolymer, having lower viscosity number of 1.23 dl./gm., coincided with the curve of FIG. 1 at 185° C. The points on FIG. 1 marked (a) and (b), shown by asterisks, represent repetitions of U.S. Pat. No. 3,169,121 Example 5; and points (c), (d) and (e), shown by "+", represent experiments employing TPC in the procedure of U.S. Pat. No. 3,169,121 Example 1.

By IR analysis, the resulting polymer contained mol ratio of BPA:TP:carbonate moieties of 2:0.77:1.23, i.e. lower than the TPA proportion specified for our polymers. Its viscosity number ("I.V.") was 0.86 dl./gm. Its $T_G$ was 174° C. and HDT was 165° C., representing significantly lower heat resistance than typical for our 2:1:1 polymers having similar I.V. ($T_G$=ca. 180° C. per FIG. 1 hereof). Its Izod impact resistance (ft.-lb. per inch of notch) at 25° C. was 7.

Example 4—Upper limit of TPA moiety

Procedure was the same as in the above comparison Example A, except the mol ratio of BPA in the charge:TPC was 2.0:1.2.

By IR analysis, the resulting polymer contained mol ratio of BPA:TP moieties of 2:1.2.

The viscosity number was 0.72 dl./gm. and $T_G$ was 188° C. Izod impact resistance (ft.-lb. per inch of notch) at 25° C. was 6.

A sheet was formed from the above polymer by compression molding at 320° C. Scratch resistance tests, comparing this sheet to a sheet of our 2:1 polymer and to sheets of commercial coated and uncoated polycarbonate, via percent transmission of light after a standard Taber abrading procedure are as follows:

| Polymer | Light Transmission |
|---|---|
| (1) Coated polycarbonate - | 93% |
| (2) Our polymer, 2:1.2 feed (BPA:TPC) - | 85 |

-continued

| Polymer | Light Transmission |
|---|---|
| (3) Our polymer, 2:1.0 feed (BPA:TPC) - | 82 |
| (4) Uncoated polycarbonate - | 60 |

Tests were made to study abrasion resistance as a function of viscosity number ("I.V.") for our polymers obtained using 2:1 mol ratio of BPA:TPC in the feed. The results are shown in Table 6 below.

Table 6

Abrasion Resistance of Compression Molded Discs
(Expressed as weight loss in milligrams) - Taber
abrasion tester using C5-10F wheel and 500 gm. load
2:1 ratio BPA:TPC polyester/
carbonate copolymers

| | Initial I.V. (dl./gm.) | | | | | | Commercial Polycarbonates | |
|---|---|---|---|---|---|---|---|---|
| | 0.64 | 0.72 | 0.96 | 1.39 | 1.84 | 2.55 | | |
| | I.V. after molding | | | | | | Un- | Surface |
| Cycles | 0.57 | 0.60 | 1.0 | 1.19 | 1.12 | 2.18 | coated | Coated |
| 100 | 0.0 | 0.0 | 0.7 | 0.0 | 0.4 | 1.2 | 0.0 | 0.2 |
| 200 | 0.5 | 0.0 | 1.1 | 0.2 | 0.9 | 1.5 | 0.0 | 1.4 |
| 500 | 1.8 | .05 | 1.9 | 0.5 | 1.8 | 2.1 | 3.2 | 3.7 |
| 1000 | 5.2 | 2.1 | 2.6 | 2.1 | 4.5 | 5.6 | 9.1 | 6.1 |
| 1500 | 8.6 | 3.5 | 5.3 | 3.8 | 6.5 | 8.5 | 14.4 | 9.1 |
| 2000 | 11.5 | 5.0 | 6.6 | 5.9 | 8.5 | 10.6 | 18.3 | 12.1 |

Note: Comparison polymers like "A" and "B" of Tables 2 and 3 above, but having initial viscosity numbers of about 1 dl./gm., were found to be too thermally unstable to allow compression molding of sheets for testing of abrasion resistance.

Among additional properties of our polymers which have been investigated is solvent resistance. Compared to that of commercial polycarbonate, it is significantly higher for a variety of solvents, as shown by the stress crazing tests of Table 7 below. A polymer of our invention and a commercial polycarbonate polymer were compared by the cantilever beam method to determine minimum fiber stress (tensile) to cause visible crazing after 5 minutes of contact with the solvent.

Table 7

| Solvents | Heptane | i-PrOH | CCl₄ | Toluene | Butyl Acetate |
|---|---|---|---|---|---|
| Stress (psi) our polymer | 9,000 | 9,000 | 5,000 | 300 | 500(a) |
| Stress (psi) polycarbonate | 4,800 | 6,000 | 500(a) | 150 | 370 |

(a)Specimen broke

Instead of, or in addition to TPC, other aromatic dicarboxylic acid chlorides can form polyester/carbonate copolymers with BPA, broadly similar to the above. Specifically, when substituted for TPC in essentially the procedure of Example 3 above, 2,6-naphthalene dicarboxylic acid dicloride afforded a polyester/carbonate copolymer having I.V.=1.17 dl./gm., $T_G$=200° C., and excellent solvent resistance. 4,4'-Benzophenone dicarboxylic acid dichloride when reacted similarly with BPA (using acetone as precipitating liquid in the isolation) afforded a polyester/carbonate having I.V.=1.79 dl./gm., $T_G$=210° C., HDT=190° C. and Izod impact resistance of 5 ft.-lb. per inch of notch.

We claim:

1. Bisphenol-A/terephthalate/carbonate copolymer characterized by:
   (1) being melt processable in the sense that
       (a) upon compression molding for 10 minutes at 320° C. to form a plaque, said polymer changes in viscosity number by no more than 10% as measured in 40:60 weight ratio of tetrachloroethane:phenol at 25° C. an 0.5 gm./dl. concentration; and
       (b) when heated under purified nitrogen for 30 minutes at 350° C., then dissolved as a 2% (gm./ml.) solution in dichloromethane, the polymer develops a ∓yellowness index" per ASTM Test No. D:1925, using a 2 cm. path, of no more than 10;
   (2) having mol ratio, in the polymer product, of bisphenol-A:terephthalate moieties in the range between 2:0.8 and 2:1.3;
   (3) having essentially only short segments of polycarbonate, averaging not over 2.5 molecular units in length each;
   (4) having viscosity number measured at 25° C. and 0.5 gm./dl. in the range between 0.6 and 1.5 dl./gm; and having $T_G$, by differential scanning calorimetry at 20° C./min. in argon on a quenched sample, in the range between 170° C. and 194° C., with relationship of $T_G$ to viscosity number, I.V., conforming to the formula: $T_G = 192 - (11.5/I.V.) \pm 9$, and with difference between $T_G$ and heat distortion temperature, measured per ASTM Test No. D-648, of not over 15° C.;
   (5) having Izod impact resistance (ft.-lb. per inch of notch) at 25° C. of at least 5; and
   (6) having pyridine content not over 200 parts per million and essentially free of anhydride linkages.

2. Copolymer of claim 1 consisting essentially of bisphenol-A, terephthalate and carbonate moieties in the mol ratio range from 2:0.9:1.1 up to 2:1.2:0.8 and having viscosity number in the range of 0.6 to 1 dl./gm., $T_G$ of at least 178° C. and heat distortion temperature of at least 170° C.; and having Izod impact resistance (ft.-lb. per inch of notch) at 25° C. of at least 6 ft.-lb. per inch of notch.

3. Polymer of claim 2 consisting, to the extent of at least 90% by weight, of the residue of the bisphenol-A diester of terephthalate acid, alternating in the polymer chain with carbonate linkages.

4. Process of producing the bisphenol-A/terephthalate/carbonate copolymer of claim 1, wherein:
   (1) terephthaloyl chloride is admixed with bisphenol-A at about 2:1 mol ratio of bisphenol-A:terephthaloyl chloride, in solution in a reaction medium of pyridine and chlorinated organic solvent which medium is capable, at from 1:3 to 10:1 volume ratio of chlorinated solvent:pyridine, of dissolving low molecular weight bisphenol-A/terephthalate polyesters and dissolving or colloidally dispersing the final polymer; said reaction medium containing at least a small excess but not more than a 14-fold excess of pyridine over the theoretically required pyridine to combine with the theoretical amount of hydrogen chloride produced in production of the polymer;
   (2) the reaction of terephthaloyl chloride and BPA is carried out at temperature not above 35° C.;
   (3) thereafter a phenolic compound to serve as molecular weight regulator is added to the reaction mixture;
   (4) then phosgene is introduced into the resulting reaction mixture;
   (5) when a predetermined viscosity of the product is reached, addition of phosgene is terminated; and (6) then a further quantity of phenolic compound is added as chain terminator.

5. Process of claim 4 wherein the chlorinated organic solvent is dichloromethane; the dichloromethane is in a ratio of at least 2:1 by volume with the pyridine; the combined weight of bisphenol-A and terephthaloyl chloride in the solution is at least 10 gm. per 100 ml. but not above the upper limits defined by the curve of FIG. 5 of the drawings; and the temperature during the reaction of terephthaloyl chloride with bisphenol-A is maintained at not above 25° C.

* * * * *